United States Patent [19]

Enrietti et al.

[11] 4,222,731
[45] Sep. 16, 1980

[54] MOLDING PRESS FOR PLASTIC MATERIALS

[76] Inventors: Leo Enrietti, Via Perloz, Pont-Saint-Martin (Aosta); Piero Enrietti, Via Roma 72, Donnaz (Aosta), both of Italy

[21] Appl. No.: 968,782

[22] Filed: Dec. 12, 1978

[30] Foreign Application Priority Data

Jan. 9, 1978 [IT] Italy ................................ 67019 A/78

[51] Int. Cl.$^2$ ........................... B29C 3/00; B29F 1/06
[52] U.S. Cl. .................................. 425/451.5; 425/592; 425/451.9; 425/DIG. 221
[58] Field of Search .................. 425/450.1, 451.5, 589, 425/590, 592, 595, 451.9, DIG. 221

[56] References Cited

U.S. PATENT DOCUMENTS

| | | | |
|---|---|---|---|
| 1,541,966 | 6/1925 | Kappele | 425/451.5 X |
| 3,195,186 | 7/1965 | Gauban et al. | 425/590 |
| 3,323,173 | 6/1967 | Poyner | 425/590 |
| 3,334,384 | 8/1967 | Ludwig | 425/595 X |
| 3,624,672 | 11/1971 | Spivy | 425/589 X |
| 3,787,165 | 1/1974 | Fischer et al. | 425/450.1 |
| 3,854,586 | 12/1974 | Herbst et al. | 425/451.5 X |
| 3,981,671 | 9/1976 | Edwards | 425/450.1 X |

FOREIGN PATENT DOCUMENTS

| | | | |
|---|---|---|---|
| 2020363 | 11/1971 | Fed. Rep. of Germany | 425/450.1 |
| 2146245 | 3/1973 | Fed. Rep. of Germany | 425/451.5 |
| 1377074 | 9/1964 | France | 425/589 |
| 249602 | 1/1970 | U.S.S.R. | 425/593 |

Primary Examiner—Philip Anderson
Attorney, Agent, or Firm—Young & Thompson

[57] ABSTRACT

A press for molding plastic materials wherein a stationary head and a movable head, arranged for receiving the two parts of a mold, are mounted on a base in which is installed a horizontal longitudinal member having pivoted at its ends vertical rocker levers. The upper ends of the rocker levers are connected to the stationary head and to the movable head respectively, and the lower ends thereof are connected to the ends of a hydraulic piston-cylinder assembly, which, thereby, applies to the heads a clamping force adequate to join the parts of the mold during the molding operation, without loading the base of the machine.

8 Claims, 2 Drawing Figures

MOLDING PRESS FOR PLASTIC MATERIALS

This invention relates to a molding press for plastic materials, of the type comprising a stationary head, mounted on a base, and a movable head, both heads being arranged to receive the two parts of a mold, and means for approaching the movable head to the stationary head in order to join under an adequate pressure the two parts of the mold during the molding operation and to move away the movable head during the removal of the molded article.

In prior art presses, a group of four columns connects the stationary head to a bearing plate, and a hydraulic cylinder, possibly provided with a toggle rod, is arranged between the bearing plate and the movable head which is guided in its movement by the said four columns; this arrangement allows to apply between the heads the required high clamping force without unduly loading the bed of the machine. However, various disadvantages arise from the presence of said four columns. In some machines, for avoiding these disadvantages, a single column or longitudinal member is provided and the fixed and movable heads are connected to the ends of levers, on the opposite ends of which acts a hydraulic cylinder-piston assembly for both moving the movable head and clamping together both heads, whilst the single column withstands the reaction force exerted by the levers. However, the cylinder-piston assembly should have a large cross section for being able to apply high force in the clamping stroke; and therefore its movement is rather slow and requires considerable time for effecting the approach or removal stroke, which is relatively long although requiring no considerable force. This unduly extends the period of time needed for opening and closing the mold between two successive molding operations.

It is an object of the present invention to avoid or reduce the disadvantages of the known machines by eliminating both the presence of the four columns and the extension of the period of time required for opening and closing the mold between successive molding operations.

This object is attained, according to the invention, by the fact that, in a machine of the last-mentioned type, at least one of the levers extending from one head to the hydraulic cylinder-piston assembly if divided into a portion connected to the head and a portion connected to the cylinder-piston assembly. There is a releasable rigid connection means between the two portions of said lever, and an auxiliary closure piston-cylinder assembly is connected to the stationary base of the machine and to the movable head. In this way, the approach and removal of the movable head are carried out by the auxiliary piston-cylinder assembly, having small cross section and therefore high movement speed, whilst the cylinder-piston assembly of larger cross section operates only for the application of the high clamping force. The movable head may be mounted on the base by means of an accurate guide system which is not subject to high loads. The connection between the levers and the heads of the machine may be carried out in suitably selected positions with a view toward minimizing the deformations of the heads under stress, which renders the machine adapted to mold not only thermoplastic materials, but also thermosetting and rubbery materials.

Preferably, the guidance of the movable head on the base is carried out by means of a hydrostatic sustentation system, thus obtaining a high smoothness and positional precision and avoiding any wear.

Finally, all said levers, portions of levers and longitudinal members preferably are double and are arranged symmetrically relative to the longitudinal vertical plane of symmetry of the machine.

An embodiment of the invention will now be described in detail, by way of non limiting example, with reference to the accompanying drawing, in which.

Figure 2:
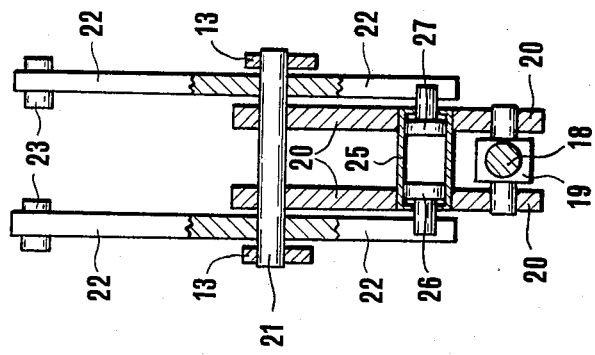
FIG. 2 is a sectional view, substantially orthogonal to that of FIG. 1, of the system of levers connected to the movable head.
Figure 1:
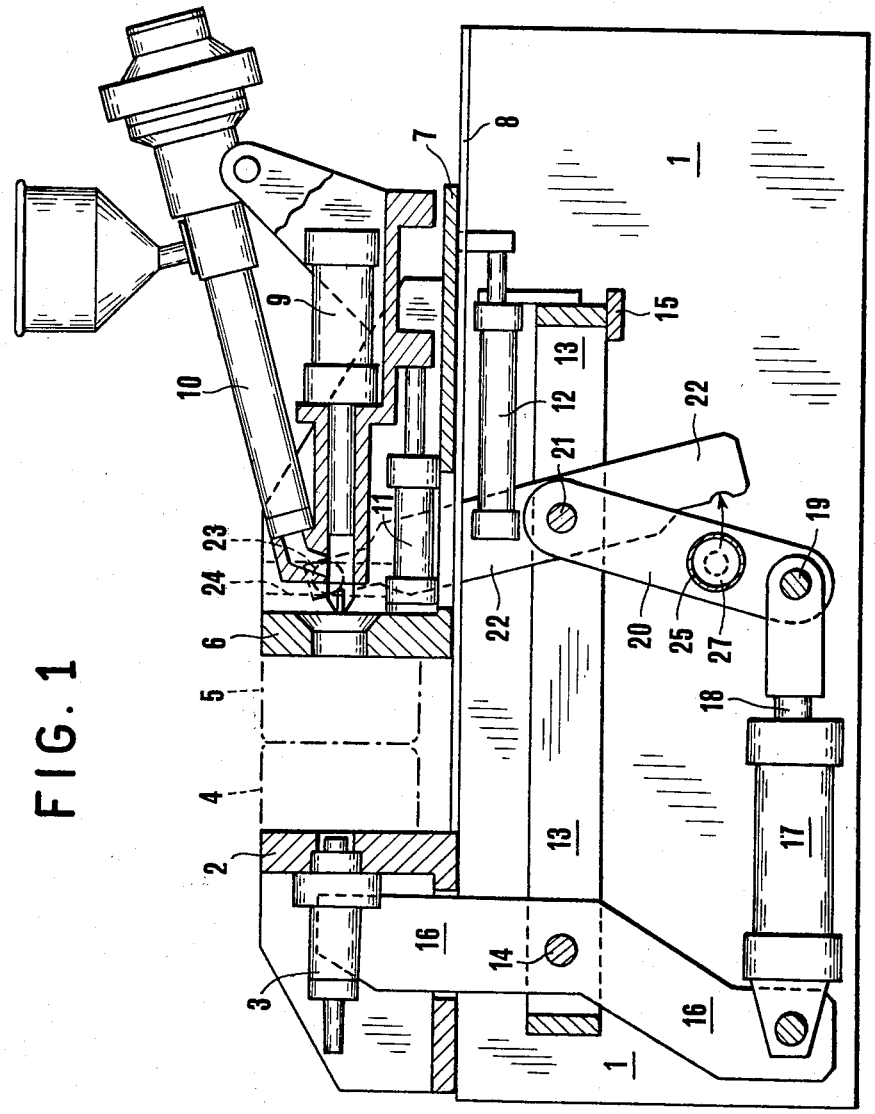
FIG. 1 is a diagrammatic sectional view of the main parts of the machine along the longitudinal vertical plane of symmetry of the machine.

Reference numeral 1 indicates the machine base, which may have a relatively light structure, on which the stationary head 2 is mounted, which supports an expeller device 3 and is intended to receive the stationary part of a mold, diagrammatically shown at 4. The movable part 5 of the mold is supported by a movable head 6 mounted on a ram 7 slidable on guides 8 of the base 1. As already stated, preferably the ram 7 is provided with a hydrostatic sustentation system on the guides 8, thus ensuring high positional precision, smoothness and absence of any wear.

Movable head 6 supports, in a known manner, an injection assembly 9 and a plasticization and feeding assembly 10, which are susceptible of being uncoupled from the mold by means of a de-coupling control assembly 11. A closure piston-cylinder assembly 12 is connected between the base 1 and the ram 7 to control the closure and opening of the molds, without, however, being able to apply the clamping force necessary at the moment of carrying out the molding operation.

Installed in the base 1 is a pair of longitudinal members 13 fastened, on one side, to the base by means of an axle 14 and supported, on the other side, by a support 15. Mounted on the axle 14 is a pair of rocker levers 16 whose upper ends engage the stationary head 2, preferably at both sides of the expeller device 3, whilst on their lower ends a hydraulic cylinder 17 is pivoted whose piston rod 18 terminates with a head 19 articulated on a pair of levers 20 which in turn are pivotally mounted on an axle 21 carried by the longitudinal members 13. Articulated on the same axle 21 are two rocker levers 22 whose upper ends carry cylindrical sliding blocks 23 engaged in channel-shaped guides 24 of the movable head 6. Levers 20 support a hydraulic double action cylinder 25 having two pistons 26 and 27 whose piston rods, in the extended position, dispose themselves on the trajectories of lower ends of the levers 22, whilst in their withdrawn position they do not interfere with said trajectories.

The operation of the machine takes place as follows: At the moment of installing the equipment, molds 4 and 5 are mounted onto the heads 2 and 3, without any difficulty thanks to the absence of columns. Then the movable head 6 is moved by means of closure cylinder 12 until it closes the molds 4 and 5; feeding assembly 10 and injection assembly 9 are brought into the operative position by the action of cylinder 11. Pistons 26 and 27 of cylinder 25 are brought into the projecting position, and then cylinder 17 is supplied with liquid and slowly moves the levers 20 until the rods of the pistons 26 and 27 arrive into contact with the levers 22. At this point, cylinder 17 applies between the heads 2 and 6, hence between molds 4 and 5, the clamping force, and the molding operation may be carried out.

Once the molding operation has been carried out, cylinder 17 is released, then also cylinder 25 is released thus disengaging the levers 22 from the levers 20, and the molds are opened by means of cylinder 12, the molded article is extracted, the molds are closed again by means of cylinder 12, and, through reactivation of the cylinder 25, the connection between the levers 20 and 22 is re-established again and cylinder 17 may again apply the clamping force without performing any appreciable stroke, since it has remained substantially in the same preceding position. Thus, a substantial stroke of cylinder 17 in the one or the other direction is required only when the machine is equipped with molds having a total thickness greater or smaller than that of the molds mounted previously. In this case, as can be appreciated, the adaptation of the machine to the different thickness of the molds is completely automatic, in contrast with the relatively long and difficult adjustments required by the known machines. Thus, the machine according to the invention has particular qualities of versatility and rapidity and easiness of use.

A particular advantage which is obtained by applying the present invention consists in that the expeller device is connected to the stationary head instead of being connected, as in the known machines, to the movable head of the press. Therefore, the part of the mold which is situated on the side of the expeller, which part generally is the heavier one, is stationary, whilst the other part, which is the lighter one, is movable. Therefrom results an appreciable reduction of the mass in movement, which allows to increase the speed of displacement and to reduce the stresses involved due to inertia.

Furthermore, with the machine according to the invention it is easy to adjust the closure of the molds, before carrying out the clamping, so as to perform it with a small force and, consequently, without the risk of failures in case of accidental presence of any bodies between the parts of the mold.

Of course, many modifications may be resorted to for some particular reasons. For example, the machine described hereinabove is provided with equipment suitable for the molding of thermoplastic materials, but, as already pointed out, it may be equipped for carrying out the molding of thermosetting or rubbery materials. The arrangement of the various levers and cylinders could be varied. The rigid connection system between the portions of the lever system coupled to the movable head could be realized in a different manner. More connection means 25-27 could be provided for, in order to reduce the stroke of the cylinder 17 in case of modification of the equipment of the machine.

Having thus described our invention, what we claim is:

1. A molding press for molding plastic materials, comprising a base, a stationary head fixed on said base, a movable head mounted on said base for reciprocating movement with respect to said stationary head, said stationary and movable heads being intended to receive the two parts of a mold, at least one longitudinal member installed in said base, at least one first elongated member on said longitudinal member, one end of said first member being connected to said stationary head, at least one second elongated member in the form of a rocker lever pivoted on said longitudinal member, one end of said second member being connected to said movable head, a hydraulic clamping piston-cylinder assembly having its ends connected to the other ends of said first and second members respectively, and an auxiliary closure piston-cylinder assembly of smaller cross section than the first-mentioned assembly and having its ends connected to said movable head and to said base respectively, at least one of said members being divided and comprising one portion connected to one of said heads and another portion connected to said clamping clylinder-piston assembly, and releasable rigid connection means between said two portions, whereby the approach and removal strokes are controlled with high speed and low force by said auxiliary closure piston-cylinder assembly when said rigid connection means is released, and the clamping stroke is controlled by said clamping cylinder-piston assembly with a high force exerted over a short distance when said rigid connection means is engaged.

2. A molding press as set forth in claim 1, in which said releasable connection means comprises a service hydraulic piston-cylinder assembly mounted on one of said portions of said at least one member and having a piston rod interferring, when in extended position, with the other portion of said at least one member.

3. A molding press as set forth in claim 1, wherein all said longitudinal members and elongated members are double and are symmetrically arranged with respect to a longitudinal plane of symmetry of the molding press.

4. A molding press as set forth in claim 1, wherein said movable head has a recessed transverse and rectilinear guides, and said another portion of said one member has a cylindrical sliding block inserted within and cooperating with said recessed guide of the movable head.

5. A molding press as set forth in claim 1, wherein said base has fixed guides for said movable head, and said movable head has hydrostatic sustentation means resting on and cooperating with said fixed guides of the base.

6. A molding press as set forth in claim 1, wherein said longitudinal member is substantially horizontal and said elongated members are substantially vertical with their upper ends connected to said heads and their lower ends connected to said hydraulic clamping piston-cylinder assembly.

7. A molding press as set forth in claim 1, wherein said first elongated member is in the form of a rocker lever pivotally connected intermediate its ends to said longitudinal member.

8. A molding press as set forth in claim 1, wherein said divided member is the member that is connected to said movable head.

* * * * *